(12) United States Patent
Sarpotdar et al.

(10) Patent No.: US 11,535,989 B2
(45) Date of Patent: Dec. 27, 2022

(54) VERTIPORT AND ASSOCIATED METHOD FOR ENHANCING STABILITY AND ATTENUATING NOISE DURING AN AIRCRAFT LANDING AND TAKEOFF

(71) Applicant: Aurora Flight Sciences Corporation, Manassas, VA (US)

(72) Inventors: Shekhar Mahadev Sarpotdar, Bethesda, MD (US); Yahia A. Ismail, Watertown, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 790 days.

(21) Appl. No.: 16/524,974

(22) Filed: Jul. 29, 2019

(65) Prior Publication Data

US 2021/0032820 A1    Feb. 4, 2021

(51) Int. Cl.
*E01F 3/00*     (2006.01)
*B64F 1/26*     (2006.01)
*G05B 15/02*    (2006.01)

(52) U.S. Cl.
CPC ............... *E01F 3/00* (2013.01); *B64F 1/26* (2013.01); *G05B 15/02* (2013.01)

(58) Field of Classification Search
CPC .... E01F 3/00; B64F 1/00; B64F 1/007; B64F 1/18; B64F 1/26; E01C 9/008
USPC ...................................................... 244/114 R
See application file for complete search history.

(56) References Cited

U.S. PATENT DOCUMENTS

| | | | | |
|---|---|---|---|---|
| 3,081,970 A | * | 3/1963 | Einarsson | B64F 1/26 89/1.8 |
| 3,436,036 A | * | 4/1969 | Madelung | E01C 9/008 244/114 R |
| 3,877,664 A | * | 4/1975 | Mesnet | E01F 3/00 244/115 |
| 4,202,646 A | * | 5/1980 | Herstad | E01F 3/00 244/114 R |
| 4,541,594 A | * | 9/1985 | Foley | E01C 9/008 244/110 E |
| 4,700,912 A | * | 10/1987 | Corbett | B64F 1/00 244/114 R |
| 5,407,149 A | * | 4/1995 | Singhai | G01M 9/04 73/147 |
| 5,591,904 A | * | 1/1997 | Schafhaupt | B64F 1/26 73/147 |
| 5,607,742 A | * | 3/1997 | Ing | E01C 9/008 428/592 |

(Continued)

FOREIGN PATENT DOCUMENTS

| | | | | | |
|---|---|---|---|---|---|
| CN | | 204475201 U | * | 7/2015 | |
| FR | | 2677326 A1 | * | 12/1992 | B64F 1/00 |
| KR | 20130075829 A | | * | 7/2013 | |

*Primary Examiner* — Jeremy A Luks
(74) *Attorney, Agent, or Firm* — Walters & Wasylyna LLC (57) ABSTRACT

A vertiport for an aircraft. The vertiport includes a landing platform that includes a landing surface and a plurality of primary through-openings, wherein the landing platform at least partially defines a primary chamber subjacent to the landing platform, the primary chambering having a primary chamber volume, and wherein the plurality of primary through-openings are in fluid communication with the primary chamber. The disclosed vertiport further includes an air moving unit positioned to withdraw air from the primary chamber.

23 Claims, 9 Drawing Sheets

(56) References Cited

U.S. PATENT DOCUMENTS

| | | |
|---|---|---|
| 7,207,213 B2 * | 4/2007 | Gerhardt ................ F02C 7/055 |
| | | 73/112.01 |
| 7,484,589 B2 | 2/2009 | Guo |
| 8,051,791 B2 | 11/2011 | Hovland et al. |
| 8,286,477 B2 | 10/2012 | Anders |
| 8,297,552 B2 | 10/2012 | Ying |
| 9,174,747 B2 | 11/2015 | Kang |
| 9,296,492 B2 | 3/2016 | Ying |
| 9,745,704 B1 | 8/2017 | Dotlich |

* cited by examiner

FIG. 10

VERTIPORT AND ASSOCIATED METHOD FOR ENHANCING STABILITY AND ATTENUATING NOISE DURING AN AIRCRAFT LANDING AND TAKEOFF

FIELD

This application relates to vertiports for aircraft, such as rotorcraft, and, more particularly, to structures and methods for enhancing stability and attenuating noise during an aircraft landing and takeoff.

BACKGROUND

Some types of aircraft, particularly rotorcraft, generate lift by creating a downward airflow. Single rotor aircraft, such as helicopters, create a downward airflow that disperses radially outward after colliding against the ground. Multi-rotor aircraft, such as quadcopters and the like, create multiple downward airflows (due to the multiple rotors) that, upon colliding against the ground, may flow back upwards in the spaces between the downward streams of air (e.g., the "fountaining effect"). Fountaining air can compromise stability as the aircraft attempts to land or takeoff. Fountaining air can also increase the overall time required to land or takeoff due to additional time spent attempting to stabilize the aircraft.

Many aircraft, particularly passenger-sized aircraft, have been known to generate excess noise while in use. This excess noise may be uncomfortably loud and generally unpleasant. As such, it is often less desired, if not prohibited, to operate and/or land aircrafts on or near residential areas. However, some residential areas, such as high-rise apartment buildings, may greatly benefit from the use of aircraft due to the limited accessibility of other modes of transportation to the upper levels. Thus, an apparatus and/or a method for suppressing noise in the surrounding the area where an aircraft is to be landed or taken off would find great utility.

Accordingly, those skilled in the art continue with research and development efforts in the field of aircraft landing and takeoff.

SUMMARY

Disclosed are vertiports and associated methods for enhancing stability and attenuating noise during an aircraft landing and/or takeoff.

In one example, the disclosed vertiport for an aircraft includes a landing platform that includes a landing surface and a plurality of primary through-openings, wherein the landing platform at least partially defines a primary chamber subjacent to the landing platform, the primary chambering having a primary chamber volume, and wherein the plurality of primary through-openings are in fluid communication with the primary chamber. The disclosed vertiport further includes an air moving unit positioned to withdraw air from the primary chamber.

In another example, the disclosed vertiport for an aircraft includes a landing platform that includes a landing surface and a plurality of primary through-openings, wherein the landing platform at least partially defines a primary chamber subjacent to the landing platform, the primary chamber having a primary chamber volume, and wherein the plurality of primary through-openings are in fluid communication with the primary chamber. The disclosed vertiport further includes a plurality of acoustic resonators received in the primary chamber, each acoustic resonator of the plurality of acoustic resonators includes a secondary chamber and a secondary through-opening in fluid communication with the secondary chamber. The disclosed vertiport further includes a plurality of air moving units positioned at least partially within the primary chamber, wherein the plurality of air moving units establish an airflow that moves vertically downward through the plurality of primary through-openings into the primary chamber and laterally outward from the primary chamber.

In one example, the disclosed method for enhancing stability of an aircraft includes establishing an airflow through the landing platform and into a primary chamber subjacent to the landing platform and redirecting the airflow outward from the primary chamber.

Other examples of the disclosed vertiports and methods will become apparent from the following detailed description, the accompanying drawings and the appended claims.

DETAILED DESCRIPTION

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

Figure 1:
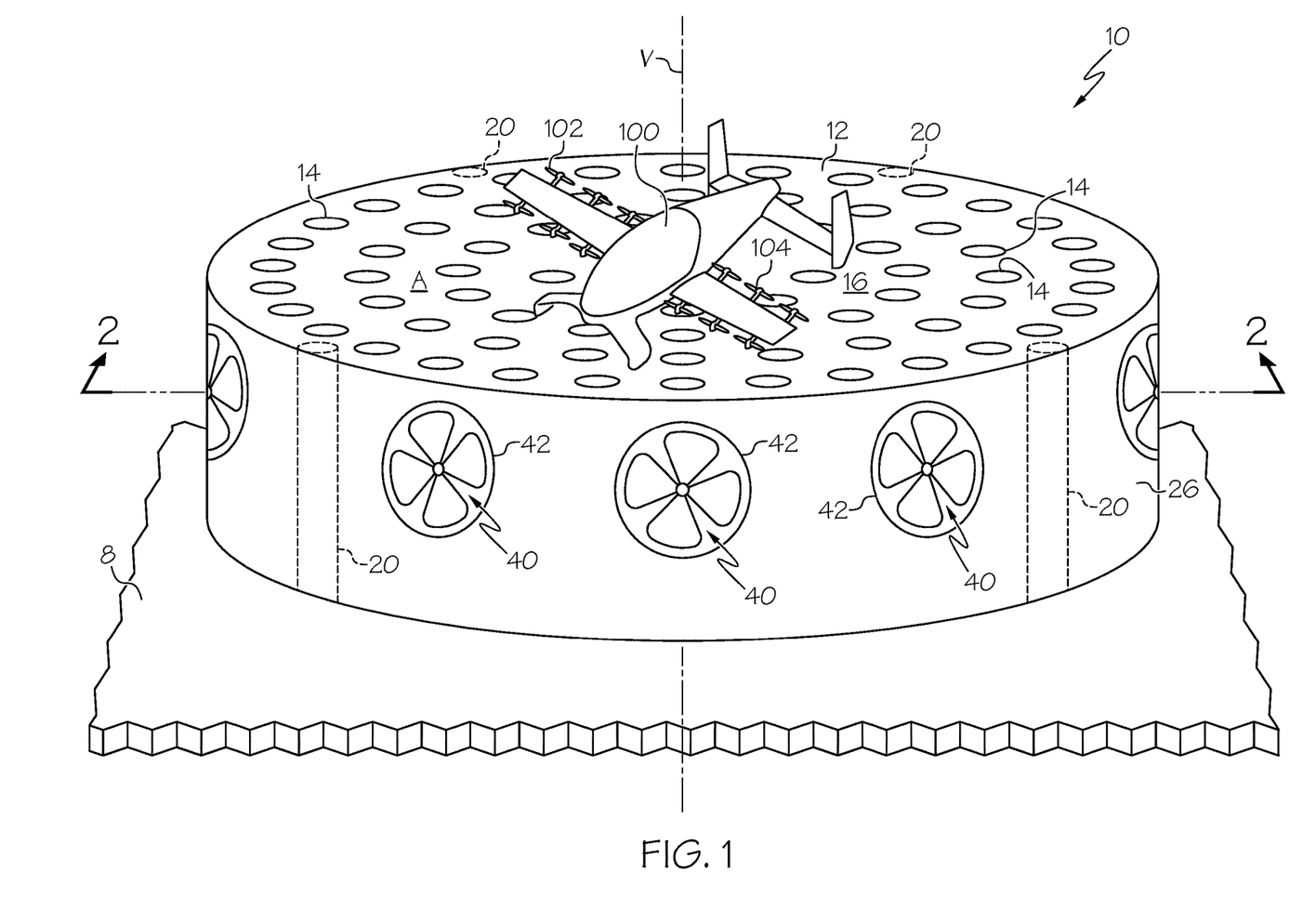
FIG. 1 is a perspective view of one example of the disclosed vertiport, showing an aircraft landed thereon.

Referring to FIG. 1, the present disclosure provides examples of a vertiport 10 for an aircraft 100. Although it is contemplated that various aircraft may be landed on the disclosed vertiport 10, it is noted that the disclosed vertiport 10 may be particularly useful in the context of landing rotorcrafts, such as helicopters and multirotor drones. More specifically, the vertiport 10 is configured to redirect the downward airflow generated by rotorcrafts, thereby reducing, if not eliminating, the "fountaining effect."

Although the present disclosure generally describes the disclosed vertiport 10 and the associated methods 200 for enhancing the stability of an aircraft in the context of landing aircrafts, it is contemplated that the disclosed vertiport may also be used for aircraft takeoffs. Those skilled in the art will appreciate, however, that methods of operation and optimal vertiport configurations may differ depending on whether an aircraft is landing on or taking off from the disclosed vertiport 10.

The vertiport 10 includes a landing platform 12 that includes a landing surface 16 and a plurality of primary through-openings 14. The landing platform 12 also at least partially defines a primary chamber 28 subjacent to the landing platform 12 (FIG. 2), wherein the primary chamber 28 has a primary chamber volume 30, and wherein the plurality of primary through-openings 14 are in fluid communication with the primary chamber 28 (e.g., fluid may flow through the primary through-openings and into the primary chamber). The vertiport 10 further includes an air moving unit 40 positioned to withdraw air from the primary chamber 28.

As shown in FIG. 1, the landing platform 12 may be generally circular and sized such that a relatively small passenger aircraft 100 may be landed on it. In other examples, however, the landing platform 12 may be sized and shaped as needed to accommodate different types of aircraft, however large or small they may be, and different types of environments. Further, in addition to the size and shape of the landing platform 12, the material composition of the landing platform 12 may also vary as needed. In one example, the landing platform 12 may be made from rigid, high strength materials such as metal or concrete slabs. This type of landing platform 12 may be suitable for receiving passenger aircrafts or aircrafts carrying heavy cargo loads. In another example, shown in FIG. 4, the landing platform 12 may be made from less rigid materials, such as a chain link mesh 22 or a metal grate (which would inherently define a plurality of primary through-openings). This type of landing platform 12 may be suitable for receiving smaller aircrafts such as remote-controlled quadcopters used by hobbyists. Those skilled in the art will appreciate that landing platforms 12 of varying shapes, sizes and material compositions may be employed without departing from the scope of the present disclosure.

The landing platform 12 includes a landing surface 16 (e.g., a designated area on the landing platform for landing an aircraft). The landing surface 16 may encompass the entire outer surface of the landing platform 12 (as shown in FIG. 1) or, alternatively, a portion of the outer surface of the landing platform 12 may be appropriated for some other purpose (such as for a walkway or a storage facility). Further, in one or more examples, the landing surface 16 may also include pilot-assisting indicia 17, which can be arranged in various locations along the landing surface 16. Pilot-assisting indicia 17 may be employed to improve landing surface visibility and convey information to an aircraft pilot. For example, the letter "H" positioned in the center of the landing surface 16 shown in FIG. 4 may enable an aircraft pilot to quickly spot the vertiport 10 while in flight and indicate to the aircraft pilot that a hospital is nearby. Those skilled in the art will appreciate that other indicia 17 may be employed for various other reasons and in various other configurations without departing from the scope of the present disclosure.

The landing platform 12 also includes a plurality of primary through-openings 14. Each primary through-opening 14 of the plurality of primary through-openings 14 extends through the landing platform 12 such that the plurality of primary through-openings 14 is in fluid communication with the primary chamber 28. Each primary through-opening 14 is shown as having the same, generally uniform cylindrical shape. Those skilled in the art will appreciate, however, that one or more primary through-openings 14 of the plurality of primary through-openings 14 may be non-uniform or non-cylindrical without departing from the scope of the present disclosure.

As shown, each primary through-opening 14 of the plurality of primary through-openings 14 may be uniformly dimensioned and sized appropriately such that the landing platform 12 may accommodate a passenger aircraft 100 (e.g., the primary through-openings 14 are small enough such that an aircraft 100 may be landed without getting caught in the landing platform 12). It is generally contemplated, however, that the size of any given primary through-opening 14 of the plurality of primary though-openings 14 may vary without departing from the scope of the present disclosure. Furthermore, referring to FIGS. 6 and 7, each primary through-opening 14 of the plurality of the plurality of primary through-openings 14 may define a through-opening axis Z and include a primary through-opening area $T_1$ measured perpendicular to the through-opening axis Z, and wherein the primary through-opening area $T_1$ of at least one primary through-opening 14 of the plurality of primary through-openings 14 is variable. More specifically, the primary through-opening 14 may include a plurality of blades 13 connected to a blade actuator 15. The blade actuator 15 may actuate the plurality of blades 13, thereby causing the blades 13 to move inward and close the primary through-opening 14 (which lowers the primary through-opening area $T_1$ of that primary through-opening 14). Those skilled in the art will appreciate, however, that other methods of increasing or decreasing the primary through-opening area $T_1$ of any particular primary through-opening 14 may be employed without departing from the scope of the present disclosure.

The distribution of primary through-openings 14 across the landing platform 12 is shown as being generally uniform. However, it is generally contemplated that the distribution of primary through-openings 14 may be varied as needed. In one example, the landing platform 12 may be divided into halves and one half may contain primary through-openings 14 while the other half does not. In another example, the landing platform 12 may be divided into halves and one half may contain larger primary through-openings 14 than the other. In yet another example, the landing platform 12 may be divided into halves and one half may contain more primary through-openings 14 than the other, wherein each primary through-opening 14 is identical in size. Those skilled in the art will appreciate that other configurations of primary through-opening locations, dimensions and distributions may be employed without departing from the scope of the present disclosure.

At this point, those skilled in the art will appreciate that the landing surface 16 may define a landing surface area A (e.g., the total amount of available space on the landing platform upon which an aircraft may be landed) that is directly correlated to the size and the total number of the primary through-openings 14. A landing platform 12 that contains a relatively large number of primary through-openings 14 will have a proportionally smaller landing surface area A than an identically dimensioned landing platform 12 with less primary through-bores 14. Similarly, the size of primary through-openings 14 may also affect the landing surface area A because larger primary through-openings 14 will result in a smaller landing surface area A than smaller primary through-openings 14. The size and total number of primary through-openings 14 are both factors that may be varied such that any given example of the landing platform 12 may be better suited for its end-use application. In one example, the plurality of primary through-openings 14 may include about 10 percent to about 25 percent of the landing surface area A. In another example, the plurality of primary through-openings 14 may include at least about 50 percent of the landing surface area A.

Figure 3:
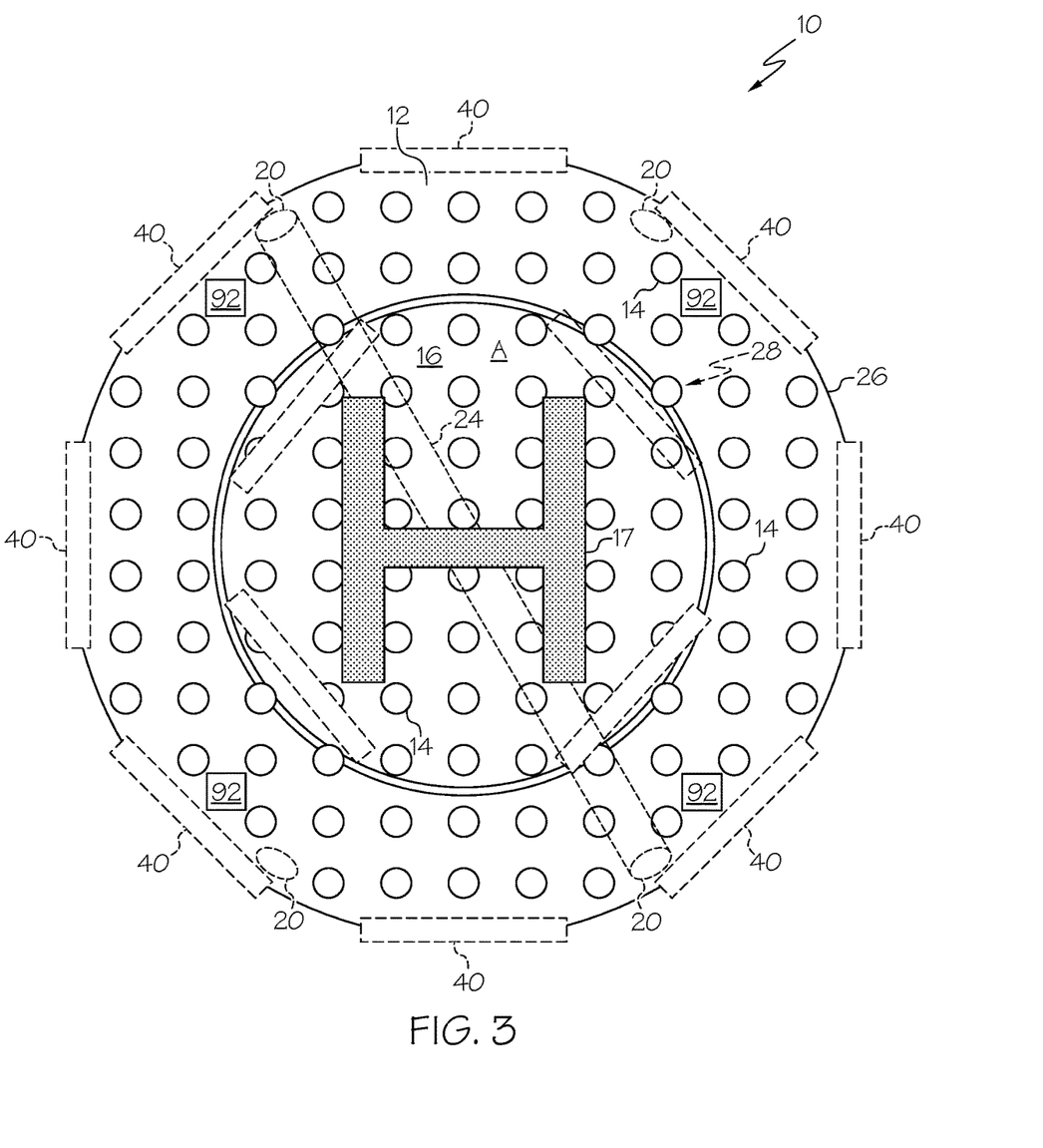
FIG. 3 is a top plan view of the vertiport of FIG. 1, but shown with the landing platform marked with pilot-assisting indicia.

As shown in FIGS. 1 and 3, one or more support structures 20 may be employed to elevate the landing platform 12 above a substructure 8. The substructure 8 may be, for example, the roof of a residential building, a platform located within a commercial warehouse, or simply the Earth. The support structures 20 may be, for example, a wall, support post or some other vertically oriented structure positioned beneath the landing platform 12. Further, the support structures 20 may be made from any suitable materials (such as wood, concrete, metal or any combination thereof) as determined by the same end-use considerations as the material composition of the landing platform 12. Ultimately, the support structure 20 should be configured to withstanding orthogonal loads applied to the landing surface 16 of the landing platform 12.

Figure 2:
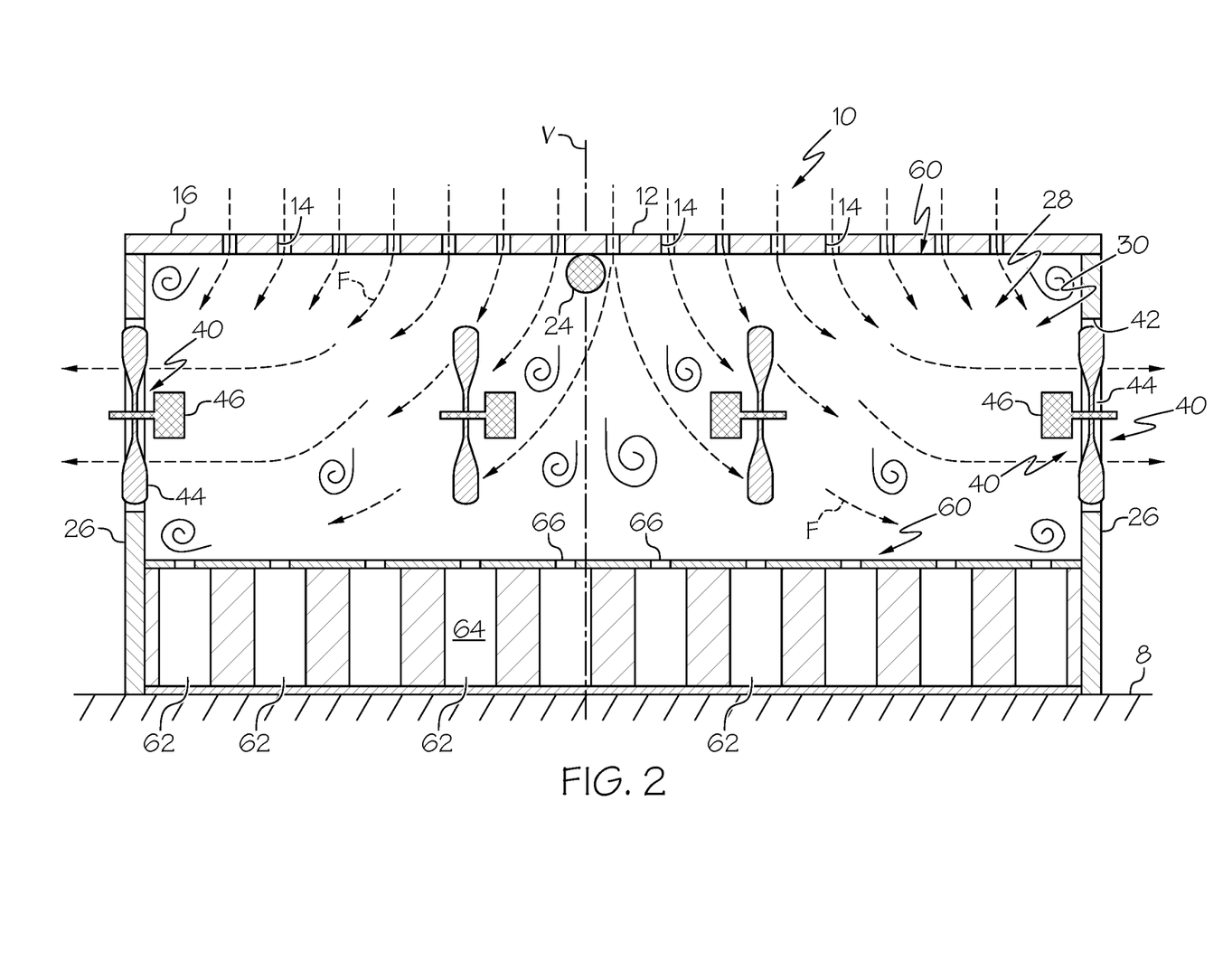
FIG. 2 is a side elevational view, in cross-section, of the vertiport of FIG. 1.
Figure 4:
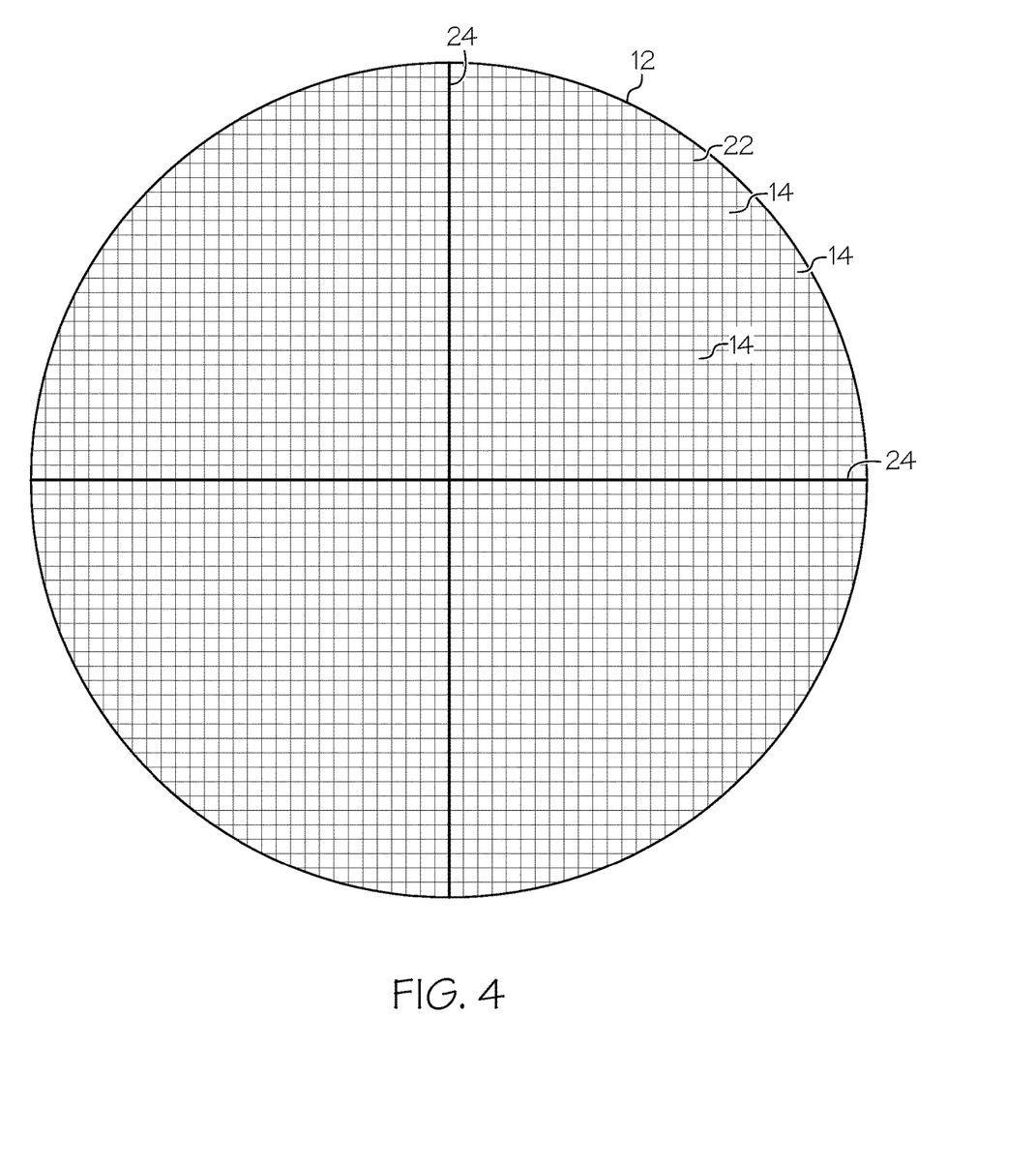
FIG. 4 is a top plan view of one alternative construction of a landing platform suitable for use with the vertiport of FIG. 1.

As shown in FIGS. 2, 3 and 4, the landing platform 12 of the vertiport 10 may also be reinforced with one or more reinforcement members 24. The reinforcement members 24 may be employed to improve the structural rigidity of the landing platform 12, thereby enabling the use of less rigid materials (e.g., chain-link mesh or metal grate) and/or heavier aircraft. Like the support structures 20, the material composition of the reinforcement members 24 may be dictated by the same end-use considerations as the material composition of the landing platform 12. As shown in FIGS. 2 and 3, the reinforcement member 24 may reinforce the landing platform 12 from below by extending across at least a portion of the landing platform 12. In other examples, however, it is contemplated that that reinforcement member 24 may be integrated directly into the landing platform 12.

In one or more example, the vertiport 10 may also include one or more side walls 26. Side walls 26 may be made from any suitable material as determined by the same end-use considerations as the material composition of the landing platform 12. As best shown in FIG. 1, a side wall 26 may be positioned subjacent to the landing platform 12 and may continuously extend around the circumference/perimeter of the landing platform 12. In other examples, however, additional side walls 26 (e.g., two or more) may be employed without departing from the scope of the present disclosure. Those skilled in the art will appreciate that the preferability of including additional side walls 26 may be dictated by fluid dynamic considerations related to the flow of air through the primary chamber 28.

Side walls 26 may include one or more openings 42 that are in fluid communication with the primary chamber 28 (e.g., fluid may flow from the primary chamber 28 through one or more openings 42 in the side wall 26). These openings 42 may vary in size depending on their intended purpose. Small openings 42 (e.g., 1 or 2 square inches) may be appropriate for simply looking into the vertiport 10 whereas large openings 42 (e.g., doorframe size) may be appropriate for actually entering the vertiport 10. Alternatively, as shown in FIG. 1, the openings 42 may be sized just large enough to receive an air moving unit 40.

The vertiport includes at least one air moving unit 40. The air moving unit 40 may be a fan 44 driven by a motor 46 (as shown) or any other appropriate device for moving air from one place to another. Referring to FIG. 2, air moving units 40 may be positioned proximate the side walls 26 or may be positioned within the primary chamber 28 spaced away from the side walls 26. In one or more example, however, air moving units 40 may be positioned both proximate the side walls 26 and within the primary chamber 28 spaced away from the side wall 26. While in use, these air moving units 40 may generate an airflow F from the landing surface 16 through the vertiport 10. More specifically, the vertiport 10 may define a vertical axis V that is substantially perpendicular to the landing surface 16 of the landing platform 12, wherein an airflow F is generated as the air moving unit(s) 40 withdraws air from the primary chamber 28, and wherein the airflow F moves vertically downward through the plurality of primary through-openings 14 into the primary chamber 28 and then is redirected laterally outward relative to the vertical axis V. The laterally redirected air may then flow out of the vertiport 10, such as through an opening 42 in a side wall 26. Without being bound by any particular theory, it is believed in that generating an airflow F through the primary through-openings 14, negative pressure is created along the landing surface 16, which thereby enables the vertiport 10 to intake the downward airflow created by an aircraft 100 (particularly rotorcrafts) and redirect it laterally outwards. In doing so, the vertiport 10 may diminish, if not eliminate, the "fountaining effect."

In operation, the air moving unit(s) 40 may generate a total volumetric flow rate. This flow rate may be constant throughout operation or may be adjusted as needed. In one example, the total volumetric flow rate may be at least 30 percent of the primary chamber volume 30 per minute. In another example, the total volumetric flow rate may be at least 50 percent of the primary chamber volume 30 per minute. In yet another example, the total volumetric flow rate may be at least 70 percent of the primary chamber volume 30 per minute.

Referring back to FIG. 2, in one or more examples, the vertiport 10 may include a noise suppressor 60. Those skilled in the art will appreciate that aircrafts typically generate significant noise as they land or take off and, as such, noise suppression may be particularly desirable in applications that involve positioning the vertiport 10 near residential areas (such as on the roof of an apartment building). The noise suppressor 60 may be any suitable noise suppressor, such as an acoustic resonator.

Figure 5:
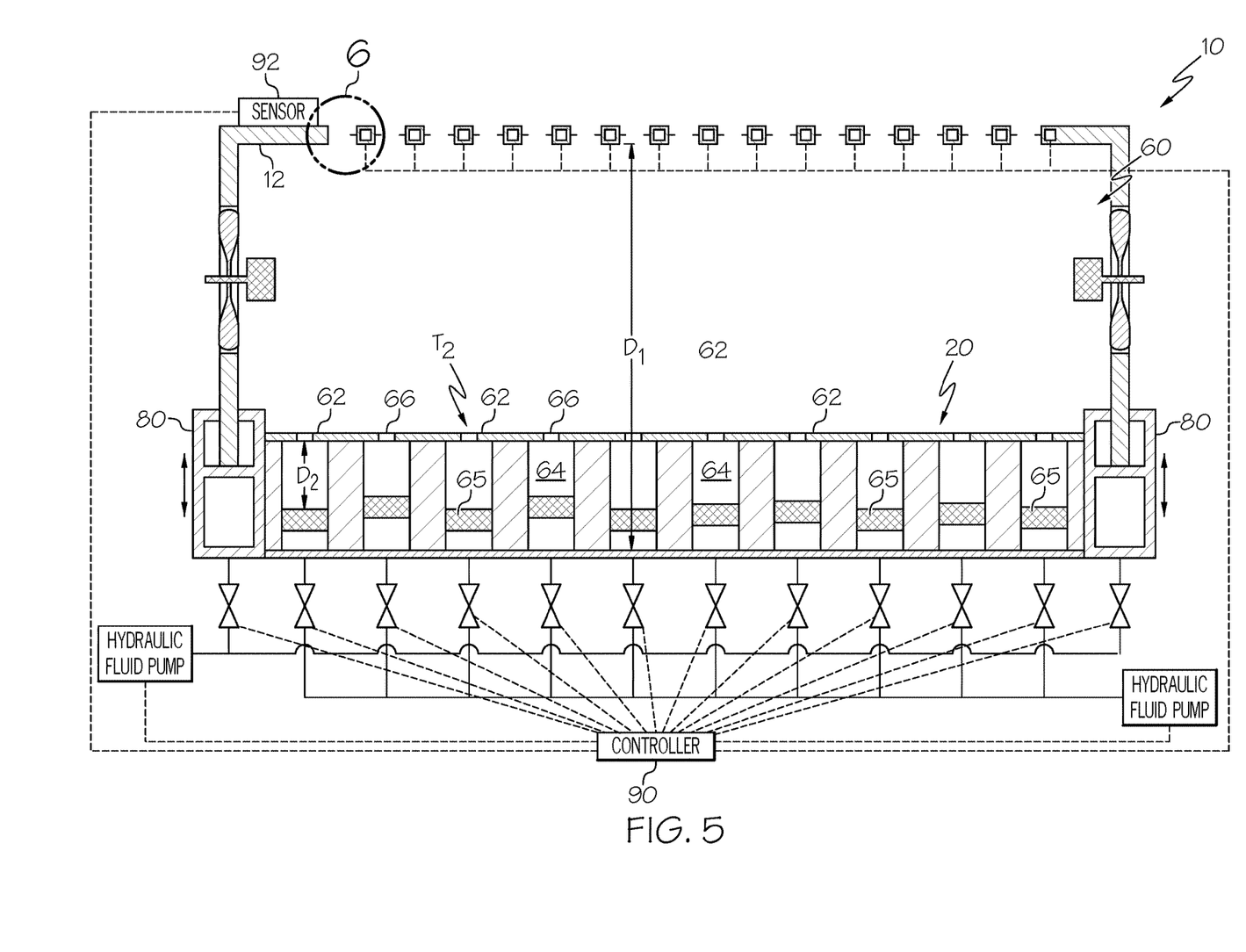
FIG. 5 is a side elevational view, in cross-section, of another example of the disclosed vertiport.

In one example, the primary chamber 28 itself may be a noise suppressor. Without being bound by any particular theory, it is believed that as the air moving unit(s) 40 draw air into the primary chamber 28 and redirects it laterally outwards, the primary chamber 28 may acoustically resonate in response to pressure differentials or vortices created by the flow of air. More specifically, the primary chamber 28 may act as a Helmholtz resonator and mitigate the noise entering the primary chamber 28, thereby reducing the total amount noise that reaches the surrounding area. Those skilled in the art will appreciate, however, that the degree to which the primary chamber 28 is actually capable of suppressing noise is dependent, at least in part, on factors that include the size of the primary chamber 28 (e.g., the primary chamber volume 30), the proportion of primary through-openings 14 to landing surface area A, and the configuration of vertiport components within the primary chamber 28 (e.g., the total quantity and relative locations of, for example, air moving units 40 and support structures 20). These factors may be varied as needed to improve noise suppression. For example, as shown in FIG. 5, the vertiport 10 may include one or more linear actuators 80 operatively connected to the landing platform 12 to move the landing platform 12 along a vertical axis V that is substantially perpendicular to the landing surface 16 of the landing platform 12, thereby defining a depth $D_1$ of the primary chamber 28. Without being bound by any particular theory, it is believed that the ideal depth $D_1$ should be approximately equal to the wavelength of the noise. Thus, the ability to change the depth $D_1$ of the primary chamber 28 enables the primary chamber 28 to adjust to variable noise conditions as they arise, thereby improving noise suppression. The linear actuators 80 may be any suitable type of actuator, such as a hydraulically operated actuator (connected to a hydrolytic fluid pump) or an actuator that includes an electric motor. Those skilled in the art will appreciate that any adjustable vertiport component may be adjusted as needed to improve the noise suppression of the primary chamber 28 without departing from the scope of the present disclosure.

Figure 6:
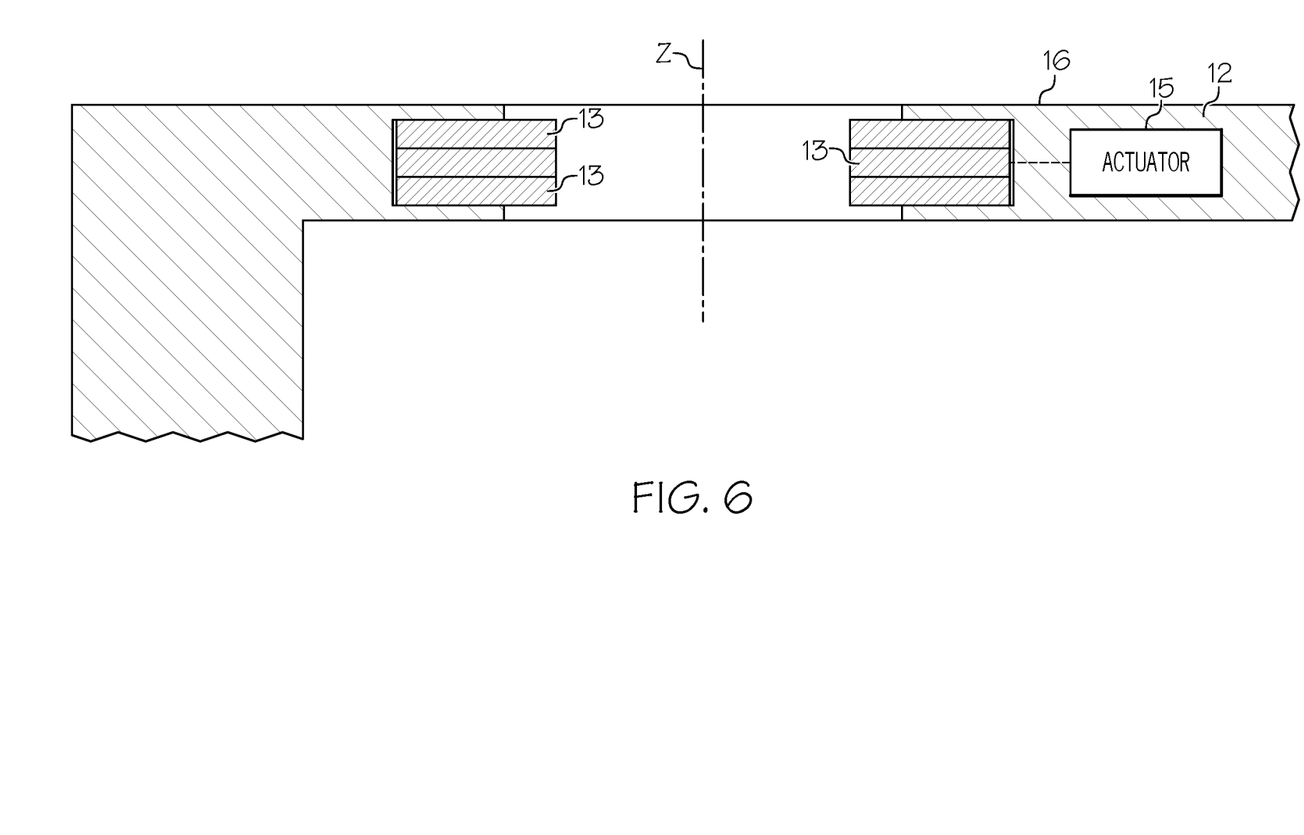
FIG. 6 is a detailed side elevational view, in cross-section, of a portion of the vertiport of FIG. 5.
Figure 7:
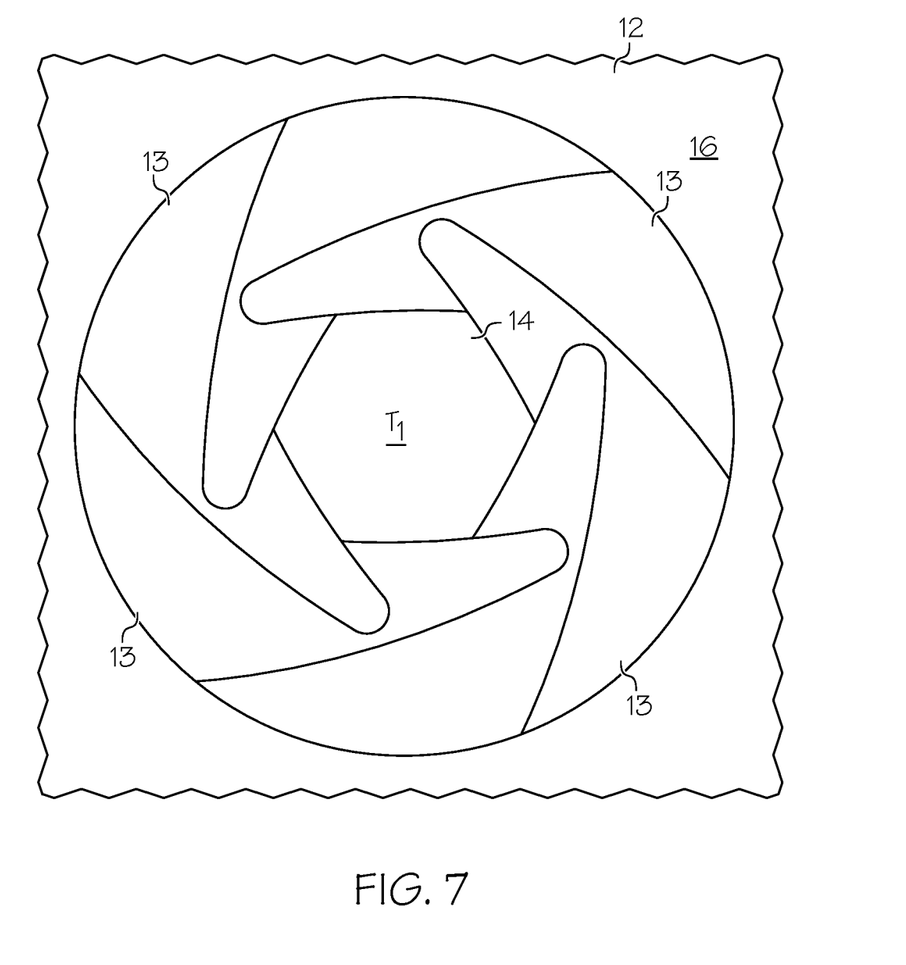
FIG. 7 is a top plan view of the portion of the vertiport shown in FIG. 6

In another example, the noise suppressor 60 may be positioned within the primary chamber 28. As shown in FIGS. 2 and 5, the noise suppressor 60 may include a plurality of acoustic resonators 62, wherein each acoustic resonator 62 of the plurality of acoustic resonators 62 includes a secondary chamber 64 and a secondary through-opening 66 in fluid communication with the secondary chamber 64. Without being bound by any particular theory, it is believed that as the air moving unit(s) 40 moves air laterally outwards, the air may flow across the secondary through-openings 66, thereby enabling the secondary chambers 64 to attenuate the noise that propagates downward from the landing platform 12 and the noise that reflects off the substructure 8. In this context, the secondary chambers 64 would attenuate sound as Helmholtz resonators. Further, in one or more examples, at least one of the secondary chambers 64 and the secondary through-openings 66 of the plurality of acoustic resonators 62 may be varied as needed to improve noise suppression. As shown in FIG. 5, a secondary linear actuator 65 may be positioned within each secondary chamber 64 of the plurality of acoustic resonators 62 as a way to define a depth $D_2$ of the secondary chambers 64. These secondary linear actuators 65 may be actuated in a similar manner as linear actuators 80 (e.g., via a hydraulic fluid pump). Likewise, the secondary through-opening areas $T_2$ may be adjusted, for example, in a similar manner as the primary through-openings 14 (e.g., with a plurality of blades 13 and a blade actuator 15 as shown in FIGS. 6 and 7). Those skilled in the art will appreciate, however, that a depth $D_2$ of a secondary chamber 64 of the plurality of acoustic resonators 62 and a secondary through-opening area $T_2$ of the secondary through-opening 66 may adjusted using other devices, structures and apparatus without departing from the scope of the present disclosure. At this point, those skilled in the art will also appreciate that the primary chamber 28 and the plurality of acoustic resonators 62 may be employed simultaneously to maximize noise suppression.

Without being bound by any particular theory, it is believed that the ability of the vertiport 10 to improve stability (e.g., by reducing the "fountaining effect"), as well as its ability to suppress noise, is related at least in part to the density of the primary through-openings 14. More specifically, it is believed that vertiports 10 that contain a relatively lower density of primary through-openings 14 (e.g., the plurality of primary through-openings 14 includes about 10 percent to about 25 percent of the landing surface area A) may be better at suppressing noise than vertiports 10 that contain a relatively higher density of primary through-openings 14 (e.g., the plurality of primary through-opening includes about 50 percent of the landing surface area A or more). Conversely, it is also believed that vertiports 10 that contain a relatively higher density of primary through-openings 14 are better at reducing the "fountaining effect" than vertiports 10 that contain a relatively lower density of primary through-openings 14 because vertiports 10 that contain a relatively higher density of primary through-openings 14 can intake more air. It is generally contemplated, however, that a vertiport 10 may be configured (e.g., tailored) such that a balance is established between an optimal density of primary through-openings 14 for noise suppression and an optimal density of primary through-openings 14 for stability control.

Referring to FIG. 5, the vertiport 10 may include a controller 90 operatively connected to one or more of the components of the vertiport 10. The controller 90 may be employed to receive data from these components and control these components as desired. Further, the controller 90 may be any suitable controller, such as a computer system or a mechanical control panel, and may be located at an off-site location or integrated directly into the vertiport 10. As shown, the controller 90 may be operatively connected to a sensor 92 positioned atop the landing surface 16, the plurality of primary through-openings 14, a hydraulic fluid pump for actuating the depth of the primary chamber 28, and another hydraulic fluid pump for actuating the depth of the secondary chambers 64 of the plurality of acoustic resonators 62. In this example, the controller 90 may be configured to control at least one of the depth $D_1$ of the primary chamber 28 and the primary through-opening area $T_1$ of at least one primary through-opening 14 of the plurality of primary through-openings 14. Further, this controller 90 may also be configured to control, for each acoustic resonator 62 of the plurality of acoustic resonators 62, at least one of a depth $D_2$ of a secondary chamber 64 and a secondary through-opening area $T_2$ of the secondary through-opening 66. Those skilled in the art will appreciate, however, the that controller 90 may be operatively connected and configured to control any of the vertiport components (particularly the air moving units 40) without departing from the scope of the present disclosure.

The vertiport 10 may include one or more sensors 92 positioned at various locations within the vertiport 10 and/or surrounding it. These sensor(s) 92 may include any suitable type of sensor, such as microphones, accelerometers and the like, any may be employed to monitor ostensibly any environmental condition, such as noise and airflow. In one example, a sensor 92 may be used to detect noise from the surrounding environment, such as the noise created during the takeoff or landing of an aircraft. This sensor 92 may also identify various noise signatures (e.g., frequency, wavelength, etc.) in order to distinguish between potential sources of the noise.

At this point, those skilled in the art will appreciate that by configuring the controller 90 and the sensor(s) 92 to be in communication with one another, the controller 90 and the sensor(s) 92 may enable the real-time feedback and control of the vertiport 10 while it is in use. Considering as how an aircraft will typically land much slower than the speed of sound, the real-time feedback and control of the vertiport 10 may enable the vertiport 10 to adjust based on the noise signature of an incoming aircraft before the aircraft even reaches the vertiport 10, thereby reducing (if not eliminating) the time the aircraft spends hovering over the vertiport 10 waiting for the vertiport 10 to adjust. Thus, the vertiport 10 may lower overall landing times of aircrafts.

In an example, the vertiport 10 for an aircraft 100 includes a landing platform 12 that includes a landing surface 16 and a plurality of primary through-openings 14, wherein the landing platform 12 at least partially defines a primary chamber 28 subjacent to the landing platform 12, the primary chamber 28 having a primary chamber volume 30, and wherein the plurality of primary through-openings 14 are in fluid communication with the primary chamber 28. The vertiport 10 of this example also includes a plurality of acoustic resonators 62 received in the primary chamber 28, each acoustic resonator 62 of the plurality of acoustic resonators 62 includes a secondary chamber 64 and a secondary through-opening 66 in fluid communication with the secondary chamber 64. The vertiport 10 of this example further includes a plurality of air moving units 40 positioned at least partially within the primary chamber 28, wherein the plurality of air moving units 40 establish an airflow F that moves vertically downward through the plurality of primary through-openings 14 into the primary chamber 28 and laterally outward from the primary chamber 28.

Figure 8:
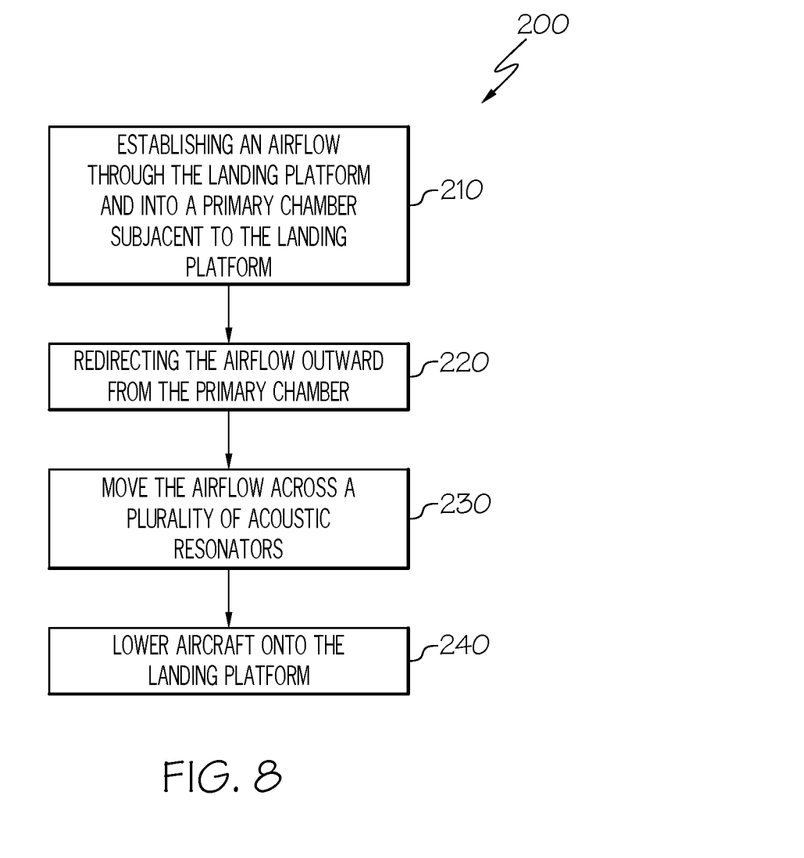
FIG. 8 is a flow diagram depicting an example of the disclosed method for enhancing stability during an aircraft landing.

Referring to FIG. 8, disclosed is an example of a method 200 for enhancing the stability of an aircraft 100 landing on a landing platform 12. The method 200 includes establishing an airflow F through the landing platform 12 and into a primary chamber 28 subjacent to the landing platform 12 (block 210) and redirecting the airflow F outward from the primary chamber 28 (block 220). Blocks 210 and 220 may be performed, for example, by using air moving units 40 positioned within and/or around the primary chamber 28 to withdraw air from the primary chamber 28, which thereby generates an airflow F through the landing platform 12.

In one or more examples, the method 200 may further include moving the airflow F across a plurality of acoustic resonators 62 positioned in the primary chamber 28 (block 230). Block 230 may be performed at any time after block 210. The acoustic resonators 62 may be, for example, adjustable Helmholtz resonators that may be adjusted by positioning a secondary linear actuator 65 within the acoustic resonator 62 and actuating the secondary linear actuator 65 as needed.

In one or more examples, the method 200 may further include lowering an aircraft 100 onto the landing platform 12 (block 240). The aircraft may be, for example, a multi-rotor aircraft (e.g., two or more rotors 102, 104). Although this step may be performed at anytime throughout the performance of the method 200, it is generally contemplated that performing block 240 simultaneously with blocks 210, 220 and 230 is preferred.

Figure 9:
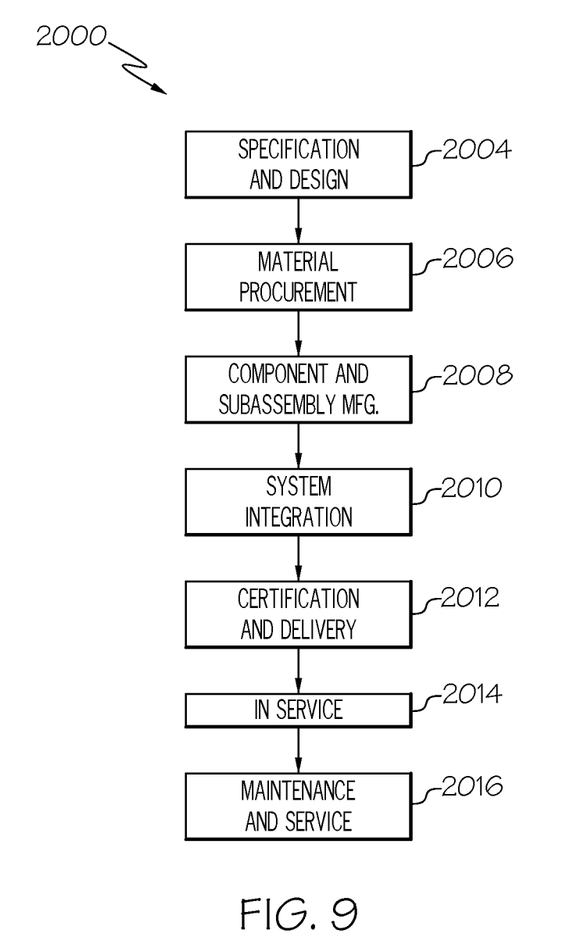
FIG. 9 is a flow diagram of an aircraft manufacturing and service methodology.
Figure 10:
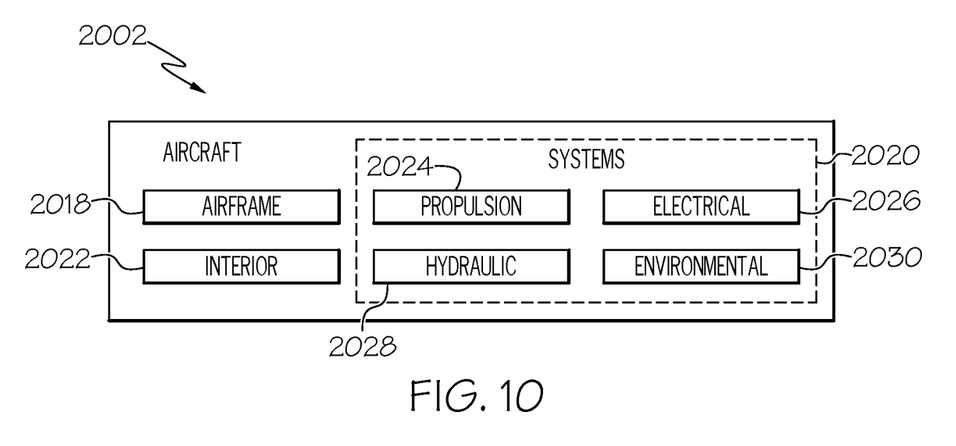
FIG. 10 is a block diagram of an aircraft.

Examples of the disclosure may be described in the context of an aircraft manufacturing and service method 2000, as shown in FIG. 9, and an aircraft 2002, as shown in FIG. 10. During pre-production, the aircraft manufacturing and service method 2000 may include specification and design 2004 of the aircraft 2002 and material procurement 2006. During production, component/subassembly manufacturing 2008 and system integration 2010 of the aircraft 2002 takes place. Thereafter, the aircraft 2002 may go through certification and delivery 2012 in order to be placed in service 2014. While in service by a customer, the aircraft 2002 is scheduled for routine maintenance and service 2016, which may also include modification, reconfiguration, refurbishment and the like.

Each of the processes of method 2000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 2002 produced by example method 2000 may include an airframe 2018 with a plurality of systems 2020 and an interior 2022. Examples of the plurality of systems 2020 may include one or more of a propulsion system 2024, an electrical system 2026, a hydraulic system 2028, and an environmental system 2030. Any number of other systems may be included.

The disclosed vertiport and associated method for enhancing stability and attenuating noise during an aircraft landing may be employed during any one or more of the stages of the aircraft manufacturing and service method 2000. As one example, the disclosed vertiport and associated method for enhancing stability and attenuating noise during an aircraft landing may be employed during material procurement 2006. As another example, components or subassemblies corresponding to component/subassembly manufacturing 2008, system integration 2010, and or maintenance and service 2016 may be fabricated or manufactured using the disclosed vertiport and associated method for enhancing stability and attenuating noise during an aircraft landing. As another example, the airframe 2018 and the interior 2022 may be constructed using the disclosed vertiport and associated method for enhancing stability and attenuating noise during an aircraft landing. Also, one or more apparatus examples, method examples, or a combination thereof may be utilized during component/subassembly manufacturing 2008 and/or system integration 2010, for example, by substantially expediting assembly of or reducing the cost of an aircraft 2002, such as the airframe 2018 and/or the interior 2022. Similarly, one or more of system examples, method examples, or a combination thereof may be utilized while the aircraft 2002 is in service, for example and without limitation, to maintenance and service 2016.

The disclosed vertiport and associated method for enhancing stability and attenuating noise during an aircraft landing are described in the context of an aircraft; however, one of ordinary skill in the art will readily recognize that the disclosed vertiport and associated method for enhancing stability and attenuating noise during an aircraft landing may be utilized for a variety of applications. For example, the disclosed vertiport and associated method for enhancing stability and attenuating noise during an aircraft landing may be implemented in various types of vehicles including, e.g., helicopters, passenger ships, automobiles and the like.

Although various examples of the disclosed vertiport and associated method for enhancing stability and attenuating noise during an aircraft landing have been shown and described, modifications may occur to those skilled in the art upon reading the specification. The present application includes such modifications and is limited only by the scope of the claims.

What is claimed is:

1. A vertiport for an aircraft, said vertiport comprising:
 a landing platform comprising a landing surface and a plurality of primary through-openings, wherein said landing platform at least partially defines a primary chamber subjacent to said landing platform, said primary chamber having a primary chamber volume, and wherein said plurality of primary through-openings are in fluid communication with said primary chamber;

an air moving unit positioned to withdraw air from said primary chamber; and at least one actuator connected to said landing platform to move said landing platform along an axis that is substantially perpendicular to said landing surface of said landing platform, thereby controlling a depth of said primary chamber.

2. The vertiport of claim 1 defining a vertical axis that is substantially perpendicular to said landing surface of said landing platform, wherein an airflow is generated as said air moving unit withdraws air from said primary chamber, and wherein said airflow moves vertically downward through said plurality of primary through-openings into said primary chamber and then is redirected laterally outward relative to said vertical axis.

3. The vertiport of claim 1 wherein said air moving unit is one of a plurality of air moving units positioned to withdraw air from said primary chamber.

4. The vertiport of claim 3 further comprising at least one side wall, said side wall further defining said primary chamber.

5. The vertiport of claim 4 wherein at least one air moving unit of said plurality of air moving units is positioned proximate said side wall, and wherein at least one air moving unit of said plurality of air moving units is positioned within said primary chamber and is spaced away from said side wall.

6. The vertiport of claim 4 wherein at least one air moving unit of said plurality of air moving units is positioned to withdraw air from said primary chamber through an opening in said side wall.

7. The vertiport of claim 3 wherein said plurality of air moving units generate a total volumetric flow rate, and wherein said total volumetric flow rate is at least 50 percent of said primary chamber volume per minute.

8. The vertiport of claim 1 wherein said landing platform is reinforced with at least one reinforcement member.

9. The vertiport of claim 1 wherein said landing platform comprises mesh and said mesh defines said plurality of primary through-openings.

10. The vertiport of claim 1 wherein said landing surface has a landing surface area, and wherein said plurality of primary through-openings comprise about 10 percent to about 25 percent of said landing surface area.

11. The vertiport of claim 1 wherein said landing surface has a landing surface area, and wherein said plurality of primary through-openings comprise at least about 50 percent of said landing surface area.

12. The vertiport of claim 1 further comprising a support structure elevating said landing platform relative to a substructure.

13. The vertiport of claim 1 wherein each primary through-opening of said plurality of primary through-openings defines a through-opening axis and comprises a primary through-opening area measured perpendicular to said through-opening axis, and wherein said primary through-opening area of at least one primary through-opening of said plurality of primary through-openings is variable.

14. The vertiport of claim 13 further comprising:
a controller; and
a sensor in communication with said controller,
wherein said controller controls at least one of:
said depth of said primary chamber; and
said primary through-opening area of said at least one primary through-opening of said plurality of primary through-openings.

15. The vertiport of claim 1 wherein said primary chamber is a noise suppressor.

16. The vertiport of claim 1 further comprising a noise suppressor positioned in said primary chamber.

17. The vertiport of claim 16 wherein said noise suppressor comprises a plurality of acoustic resonators, each acoustic resonator of said plurality of acoustic resonators comprises a secondary chamber and a secondary through-opening in fluid communication with said secondary chamber.

18. The vertiport of claim 17 further comprising a controller configured to control, for each acoustic resonator of said plurality of acoustic resonators, at least one of:
a depth of said secondary chamber; and
a secondary through-opening area of said secondary through-opening.

19. A vertiport for an aircraft, said vertiport comprising:
a landing platform comprising a landing surface and a plurality of primary through-openings, wherein said landing platform at least partially defines a primary chamber subjacent to said landing platform, said primary chamber having a primary chamber volume, and wherein said plurality of primary through-openings are in fluid communication with said primary chamber;
a plurality of acoustic resonators received in said primary chamber, each acoustic resonator of said plurality of acoustic resonators comprises a secondary chamber and a secondary through-opening in fluid communication with said secondary chamber; and
a plurality of air moving units positioned at least partially within said primary chamber, wherein said plurality of air moving units establish an airflow that moves vertically downward through said plurality of primary through-openings into said primary chamber and laterally outward from said primary chamber.

20. The vertiport of claim 19 further comprising at least one linear actuator operatively connected to said landing platform to move said landing platform along a vertical axis that is substantially perpendicular to said landing surface of said landing platform, thereby defining a depth of said primary chamber.

21. A method for enhancing stability of an aircraft, said method comprising:
establishing an airflow through a landing platform and into a primary chamber subjacent to said landing platform;
redirecting said airflow outward from said primary chamber; and
selectively controlling a depth of said primary chamber by linearly moving said landing platform along an axis that is substantially perpendicular to a landing surface of said landing platform.

22. The method of claim 21 wherein said aircraft comprises at least two rotors.

23. The method of claim 21 further comprising moving said airflow across a plurality of acoustic resonators positioned in said primary chamber.

* * * * *